United States Patent [19]

Takami et al.

[11] 3,723,645

[45] Mar. 27, 1973

[54] FACSIMILE RECORDING SYSTEM FOR RECORDING PATTERNS ON BOTH SIDES OF A RECORDING MEDIUM

[75] Inventors: Hirohiko Takami, Yokohama; Toshihide Kawashima, Kawasaki; Ryomei Kubota, Tokyo; Chosei Sukegawa, Yokohama, all of Japan

[73] Assignees: Asahi Shimbun Publishing Company, Ohsaka-shi; Tokyo Shibaura Electric Co., Ltd., Kawasaki-shi, Japan

[22] Filed: Mar. 3, 1971

[21] Appl. No.: 120,671

[30] Foreign Application Priority Data

Mar. 5, 1970 Japan ................................45/18535

[52] U.S. Cl. ..............................178/6.6 A, 346/74 ES

[51] Int. Cl. ..............................H04n 1/30, G11b 9/08

[58] Field of Search ..............178/6.6 R, 6.6 A, 6.7 R; 346/49, 74 E, 74 ES, 74 M, 105, 106

[56] References Cited

UNITED STATES PATENTS

| | | | |
|---|---|---|---|
| 2,213,876 | 9/1940 | Young | 178/6.6 R |
| 3,479,451 | 11/1969 | Regunberg et al. | 178/6.6 R |

*Primary Examiner*—J. Russell Goudeau
*Attorney*—Flynn & Frishauf

[57] ABSTRACT

A facsimile system wherein two recording means are spaced from each other in the direction of movement of a recording medium, such as a recording paper, and wherein each of the recording means cooperates with one side of the recording medium. The recording means are each respectively supplied with video signals from respective video signal distributors. The spacing of the recording means avoids mutual interference therebetween when they are simultaneously operated to record patterns on both sides of the recording medium at the same time.

22 Claims, 16 Drawing Figures

FACSIMILE RECORDING SYSTEM FOR RECORDING PATTERNS ON BOTH SIDES OF A RECORDING MEDIUM

This invention relates to facsimile recording systems for recording patterns on both sides of a recording medium.

In recent years, efforts have been made to develop a new type of facsimile apparatus wherein, in order to efficiently transmit and record letters, symbols, pictures and the like, (for the sake of brevity these objects are herein termed "patterns"), video signals of the patterns on both sides of a manuscript or an original are formed and are transmitted on the transmission side, and are then recorded on both sides of a recording medium by a recording device on the receiving side.

With such an improved facsimile apparatus, if the contents of a newspaper, for example, were sent to a number of subscribers, particularly individual homes, it would be possible to eliminate expensive distribution systems and newsboys, and to promptly and efficiently transmit the latest news release. It is particularly to be noted that, different from other information transmission systems, radio or television, for example, there is a remarkable advantage of forming permanently visible records on a recording medium.

One known example of a facsimile apparatus is disclosed in U.S. Pat. No. 3,479,451, issued on Nov. 18, 1969 to Regunberg et al. and entitled "Facsimile Newspaper Transmission System." This system comprises a combination of a broadcasting station and a plurality of receiving units, each receiving unit comprising a conventional television receiving set incorporated with a decoder for control signals, and a recording device. Control signals sent from the broadcasting station are demodulated in a speech circuit of the television receiving set to receive and record periodical information as well as not programmed information. In each case, visible images are recorded on both sides of the recording medium in a relatively inefficient manner.

Although this system is advantageous in that it can utilize conventional television receiving sets, it cannot record simultaneously patterns on both sides of the recording medium. The aforementioned patent discloses Xerographic or electrophotographic copier techniques as methods of recording but fails to disclose how to solve various problems involved in simultaneously forming patterns on both sides of the recording medium. Furthermore, the construction of the entire Regunberg et al. system is relatively complicated because patterns are first recorded on one (front) surface of the recording medium and then later on the other (rear) surface.

It is therefore an object of this invention to provide a novel facsimile system capable of recording information of a pattern or patterns of an original on both sides of a recording medium at substantially the same time.

Another object of this invention is to provide a novel facsimile system capable of transmitting different patterns on the front and rear sides of an original such as a newspaper, and recording these patterns on the front and rear sides of a recording sheet or paper at substantially the same time.

A further object of this invention is to provide a novel facsimile recording system wherein video signals regarding the same or different patterns of an original can be recorded substantially simultaneously on both sides of a recording sheet without undesirable interference.

SUMMARY OF THE INVENTION

According to this invention, there is provided an electrostatic recording system wherein video signals representing a pattern of an original are successively recorded on a moving recording medium by means of a recording head and the recorded pattern is then developed and fixed. The system of the invention is characterized in that there are provided first and second video signal distributors and first and second recording heads supplied with video signals from respective distributors, and that the first and second recording heads are mutually spaced apart a predetermined distance with an interference avoidance means disposed therebetween for avoiding mutual interference therebetween when the recording heads operate to electrostatically record the patterns on both sides of the recording medium, thereby enabling recording patterns at substantially the same time on both sides of the recording medium.

BRIEF DESCRIPTION OF THE DRAWINGS

The invention can be more fully understood from the following detailed description taken in conjunction with the accompanying drawings, in which.

DESCRIPTION OF THE PREFERRED EMBODIMENTS

Figure 1:
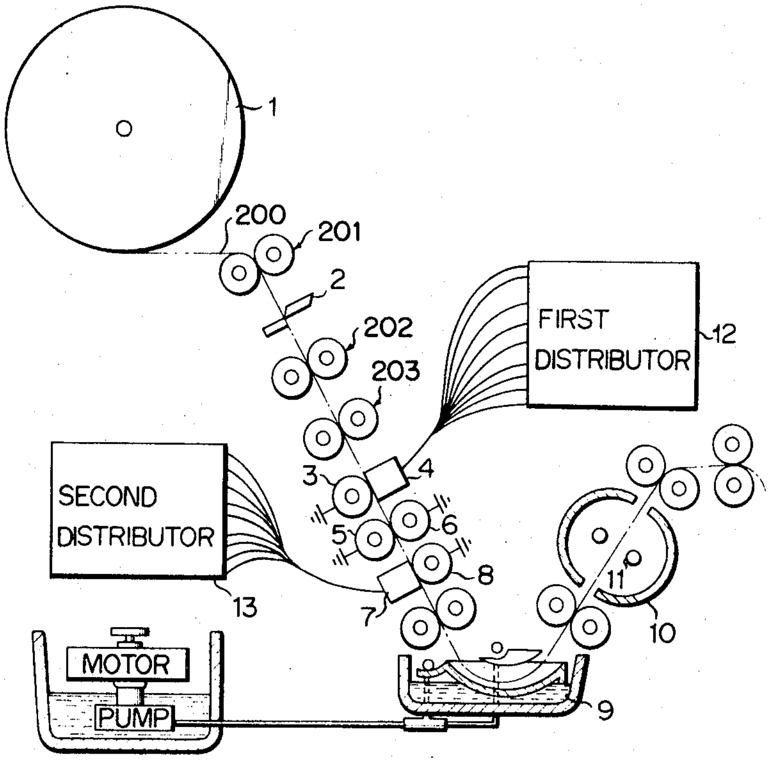
FIG. 1 is a schematic representation of a facsimile recording system according to the present invention.

FIG. 1 illustrates a general arrangement of a recording apparatus for recording patterns, e.g. letters, symbols, pictures, photographs and the like on both sides of a recording paper according to the present invention. Although not shown in detail, the recording paper or sheet 200 is of the conventional five layer construction including a substrate layer at its sectional center, electroconductive layers and recording layers on both sides of the substrate layer. In this recording apparatus, the recording paper is payed out from a roll 1 through a pair of guide rollers 201, if used, and then is cut to length by cutters 2. The recording paper 200 is guided by pairs of guide rollers 202 and 203 and is urged against a first recording head 4 by means of a rear roller 3 so that a pattern may be recorded on the front surface of the recording paper 200. Thereafter the recording paper 200 is fed to a second recording head 7 by means of another pair of guide rollers 5 and 6. Again, the recording paper 200 is urged against the second recording head 7 by means of a rear roller 8 so that a pattern may be recorded on the rear surface of the recording paper 200. Further, the recording paper 200 is advanced through a developing tank 9 and a fixing device 10 including heaters 11 to develop and fix the recorded patterns.

First and second recording heads 4 and 7, respectively, are suitably spaced apart and are connected to receive video signals from a first distributor 12 and a second distributor 13, respectively. As will be described later in more detail, these distributors may be either mechanical distributors, photoelectric distributors, electric distributors, printing tube distributors or the like for applying signal voltages successively to multi-stylus electrodes of recording heads 4 and 7, respectively. Each of rear rollers 3 and 8 and guide rollers 5 and 6 is suitably grounded or impressed with a suitable potential so that when forming an electrostatic latent image on the surface of the recording paper 200 with the first recording head 4, the equivalent circuit of the recording paper as viewed from the side of the recording head 4 is considered to be asymmetrical with respect to the substrate layer of the paper with the result that the charge will be deposited only on the front recording layer. Similarly, this phenomenon occurs when the latent image is formed on the rear recording layer of the recording paper by means of the second recording head 7. Thus, it is possible to utilize two surfaced recording papers of conventional construction.

In an electrostatic recording device, the air gaps between the recording paper 200 and respective recording head 4 and 7 (i.e. the air gap between the paper and the multi-stylus electrodes embedded in the insulators of the recording heads 4 and 7) have most suitable values determined by Paschen's law. Too narrow or too wide a gap results in a decrease in the quantity of the charge contributing to the formation of the latent image. More particularly, when the gap is too wide the dots become too large thus decreasing the resolution. The gaps can be adjusted to suitable values by finely adjusting independently the contact pressures of rear rollers 3 and 8, respectively. Such an adjusting means should be apparent and is not described herein in detail.

Figure 2:
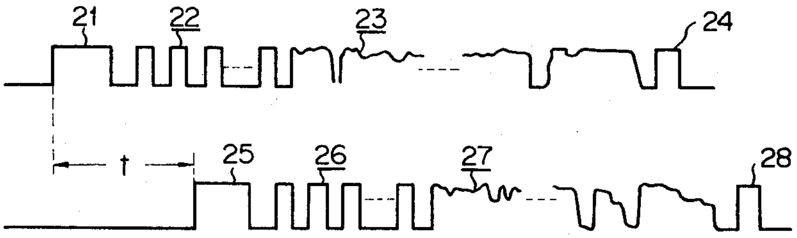
FIG. 2 shows waveforms of the information signals.

As shown in FIG. 2, the signal sent from the transmission side for recording patterns on both surfaces of the recording paper in the case of a source synchronized transmission system, for example, comprises a first information signal consisting of a start signal 21, a phase synchronizing signal 22, a video signal 23 and a termination signal 24. The first information signal is utilized for recording a pattern on the front surface of paper 200. A second information signal consisting of a start signal 25, a phase synchronizing signal 26, a video signal 27 and a termination signal 28 is utilized for recording another pattern on the rear surface of the paper 200. The first and second information signals are spaced apart by a time interval *t* corresponding to the spaced apart arrangement of two recording heads 4 and 7 on the receiving side. In other words, the time delay between the two start signals of the first and second information signals is equal to the time interval required for the recording paper 200 to travel from the first recording head 4 to the second recording head 7.

Figure 3:
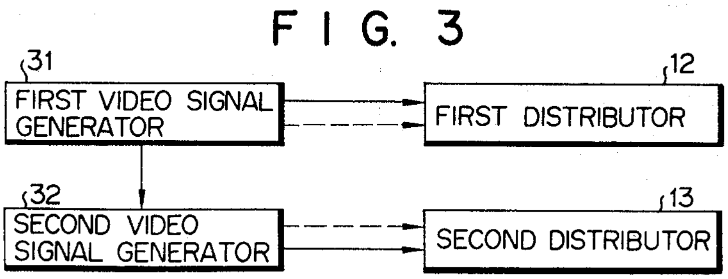
FIG. 3 is a block diagram to explain the synchronism between the video signal generator of a transmission apparatus and distributors of the receiving apparatus.

As is well known to one skilled in the facsimile art it is necessary to synchronously scan on the transmitting and receiving sides. Referring to FIG. 3, this can be accomplished by forming a synchronizing signal between a second video signal generator 32 and first and second distributors 12 and 13 by utilizing the synchronizing signal of the first video signal generator 31 as the main synchronizing signal, as shown by solid lines in FIG. 3. Alternatively, synchronization can be achieved by independently synchronizing the first and second video signal generators 31 and 32 as shown by dotted lines in FIG. 3. In each of these synchronizing systems, the time lag *t* permits positive and ready synchronization of the second video signal generator 32 and the second distributor 13 with a simple construction. Moreover, in the recording device described above, since the time delay *t* between first and second information signals is much shorter than the entire signal transmission time, it is possible to record the patterns on both surfaces of the recording paper 200 in substantially the same time as that required for transmitting and recording the information signal for only one side. Moreover, as the patterns are recorded on both sides, the recorded paper manifests a similar appearance to the printed papers of ordinary books, thus efficiently utilizing the recording paper.

Figure 4A:
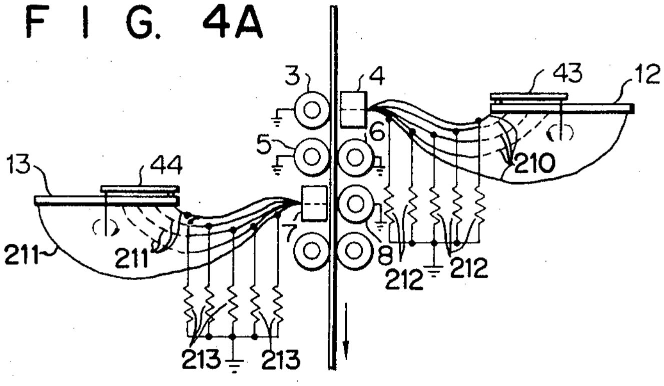
FIGS. 4A and 4B show mechanical distributors utilized in the novel facsimile recording system, FIG. 4A showing a side view and FIG. 4B a front elevation.
Figure 4B:
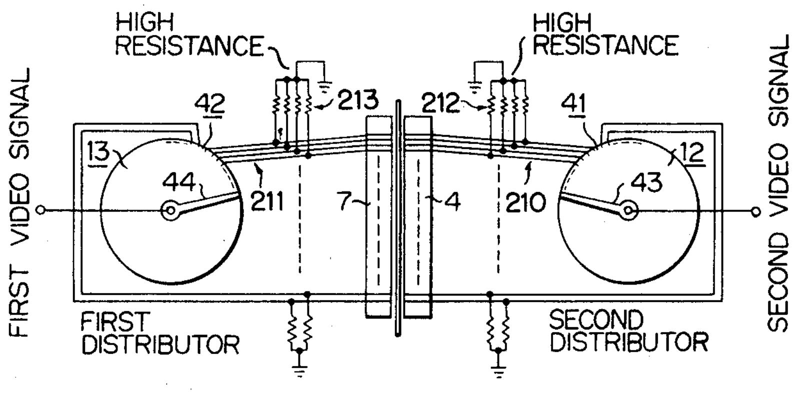

Typical examples of the first and second distributors 12 and 13 will be described hereinbelow. FIGS. 4A and 4B show mechanical distributors. In FIG. 4B, however, in order to clearly show the correspondence between first and second distributors 12 and 13, the various rollers have been omitted. First and second distributors 12 and 13 comprise insulator discs with multi-styluses 41 and 42 embedded in their peripheries and brushes 43 and 44 rotated at the main scanning speed to slide along respective styluses. Multi-styluses 41 and 42 are connected with recording heads 4 and 7, respectively, through lead wires 210 and 211, respectively, which are grounded through high resistance resistors 212 and 213, respectively, as shown. Accordingly, the first and second video signals applied to brushes 43 and 44, respectively, are distributed sequentially to respective multi-styluses of respective recording heads 4 and 7 to record patterns on both surfaces of the recording paper. These mechanical distributors may be formed of printed substrates as shown in FIG. 3 of U.S. Pat. No.

3,071,646, which issued on Jan. 1, 1963 to Robert L. Dew.

Although operating at a relatively low speed, these mechanical distributors are advantageous in that they are not expensive. To increase the density of the scanning lines and hence to improve resolution it is necessary to decrease the electrostatic induction between a stylus being impressed with a video signal and a stylus not impressed with the video signal. To this end, it is necessary to ground respective lead wires 210 and 211 through respective high resistance resistors 212 and 213 as shown in FIG. 4B, or, in the case of a distributor utilizing a printed substrate, it is necessary to connect static capacitances of value lower than the inter-stylus capacitances between respective styluses and ground potential.

Figure 5:
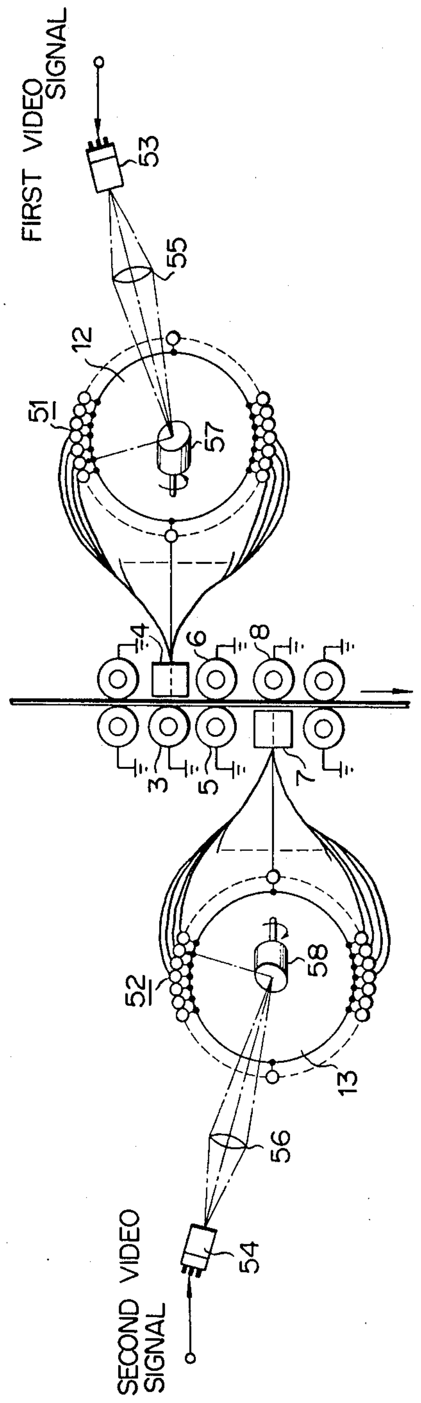
FIG. 5 is a diagrammatic representation of photoelectric distributors.

The embodiment shown in FIG. 5 utilizes photoelectric distributors. First and second photoelectric distributors 12 and 13 comprise a plurality of photoelectric converting or transducer elements 51 and 52 which are disposed in circular arrangements. The first and second video signals modulate light beams from light sources 53 and 54 respectively. The modulated light beams pass through respective optical systems 55 and 56 and are focused on mirrors 57 and 58, respectively, which are rotated at the main scanning speed. The reflected light from mirror 57 and 58 is sequentially distributed among respective photoelectric converting elements 51 and 52. The light beams are thus converted into electric signals corresponding to the video signals by the photoelectric converting elements 51 and 52, which electric signals are applied as recording voltages to recording heads 7 and 8 to form electrostatic latent images on both sides of the recording sheet in the same manner as in the previous embodiment utilizing mechanical distributors. The photoelectric distributors of FIG. 5 are noiseless, and since they have no mechanical contacts, they can operate over longer periods of time.

Figure 6:
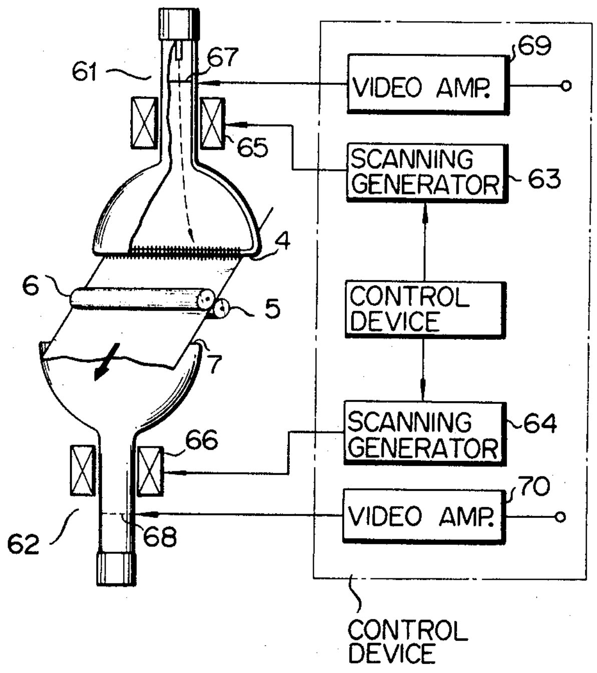
FIG. 6 shows a schematic block diagram, partly in perspective, of distributors utilizing printing tubes.

FIG. 6 shows another embodiment utilizing printing tubes 61 and 62 for high speed recording. Any suitable type of printing tube may be used, such as a pin tube including a plurality of electroconductive pins, an optical fiber tube employing a number of optical fibers or an electron beam penetration tube having fine slits. Alternatively, a combination of a flying-spot scanning tube and an optical system may also be used for high speed recording. These tubes are specified only by way of example.

Deflection coils 65 and 66 of the first and second printing tubes 61 and 62 are supplied with sweep signals from respective scanning generators 63 and 64 whereas control electrodes 67 and 68 are supplied with video signals through respective video amplifiers 69 and 70. For the reason described above, first and second printing tubes 61 and 62 are displaced a little in the direction of movement of the recording sheet in order to concurrently form electrostatic latent images on both sides of the recording sheet corresponding to video signals while eliminating interference therebetween. If the output signal from the first scanning generator 63 were supplied to deflection coil 66 of the second printing tube 62 via a suitable delay circuit, the second scanning generator 64 might be omitted.

Figure 7:
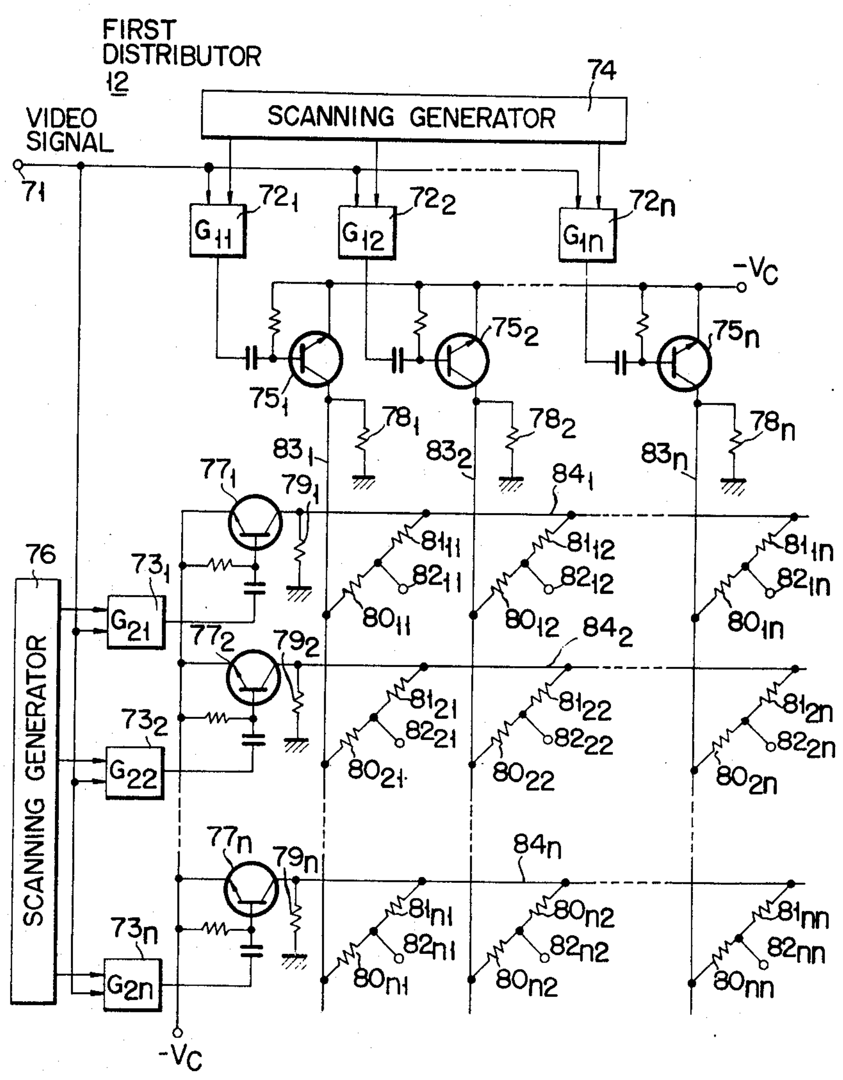
FIG. 7 is a circuit diagram of a portion of an electric distributor.

FIG. 7 shows one example of the electric circuit of an electric distributor. Although FIG. 7 shows the circuit of the only first distributor 12, it is to be understood that the circuit of the second distributor 13 is substantially identical.

In the circuit of FIG. 7, video signals are supplied to the pin electrodes of the recording head in a manner as described hereinbelow through electric elements connected in a matrix. More particularly, the video signal supplied to an input terminal 71 is applied to gate circuits $\mathbf{72_1}$, $\mathbf{72_2}$ . . . . $\mathbf{72_n}$ arranged in the X direction and gate circuits $\mathbf{73_1}$, $\mathbf{73_2}$ . . . . $\mathbf{73_n}$ arranged in the Y direction. Gate circuits $\mathbf{72_1}$, $\mathbf{72_2}$ . . . . $\mathbf{72_n}$ are sequentially enabled by the output pulse from scanning generator 74 to supply their outputs to driving transistors $\mathbf{75_1}$, $\mathbf{75_2}$ . . . . $\mathbf{75_n}$ respectively. Similarly, gate circuits $\mathbf{73_1}$, $\mathbf{73_2}$ . . . . $\mathbf{73_n}$ are enabled sequentially by the output pulse from a scanning generator 76 to produce outputs corresponding to the video signal, which are applied to driving transistors $\mathbf{77_1}$, $\mathbf{77_2}$ . . . . $\mathbf{77_n}$, respectively. Each of the scanning generators 74 and 76 may comprise a ring counter or a suitable combination of a shift register and a diode matrix. When the video signal comprises a digital signal containing information regarding a letter or a symbol, the gate circuit will perform an AND operation on the digital signal and the output pulse from the scanning generator will thus switch the driving transistors.

On the other hand, if the video signal comprises a halftone analogue signal regarding a photograph or a picture, analogue gate circuits enabled by the output from the scanning generator are used and in which case voltage amplifiers are substituted for driving transistors.

In the following description of the operation of the present invention, although it is assumed that the video signal comprises a digital signal for the sake of description, it will be clear that the principle of operation is the same for analogue signals. Suppose now that, at a given instant the video signal enables AND gate circuits $\mathbf{72_2}$ and $\mathbf{73_2}$ to form output signals. Then the output signal from AND gate circuit $\mathbf{72_2}$ turns switching transistor $\mathbf{75_2}$ ON to produce a voltage drop substantially equal to the source voltage-Vc across a high resistance resistor $\mathbf{78_2}$. Similarly, the output signal from AND gate circuit $\mathbf{73_2}$ renders switching transistor $\mathbf{77_2}$ ON to produce a voltage drop substantially equal to the source voltage −Vc across high resistance resistor $\mathbf{79_2}$. These voltage drops are supplied to a pin electrode $\mathbf{82_{22}}$ of the recording head respectively through resistors $\mathbf{80_{22}}$ and $\mathbf{81_{22}}$ of equal value. Since the source voltage −Vc is applied to only conductor $\mathbf{83_2}$, and since conductors $\mathbf{84_1}$, $\mathbf{84_3}$ . . . . $\mathbf{84_n}$ intersecting at right angles with conductor $\mathbf{83_2}$ are maintained at ground potential, pin electrodes $\mathbf{82_{12}}$, $\mathbf{82_{32}}$ . . . . $\mathbf{82_{n2}}$ other than pin electrode $\mathbf{82_{22}}$ will receive a voltage of $-(Vc/2)$. In the same manner, since the voltage − Vc is supplied to only conductor $\mathbf{84_2}$, and since conductors $\mathbf{83_1}$, $\mathbf{83_3}$ . . . . $\mathbf{83_n}$ intersecting at right angles with conductor $\mathbf{84_2}$ are at ground potential, pin electrodes $\mathbf{82_{21}}$, $\mathbf{82_{23}}$ . . . $\mathbf{82_{2n}}$ other than pin electrodes $\mathbf{82_{22}}$, which are connected in parallel with high resistance resistor $\mathbf{79_2}$, will receive the potential $-(Vc/2)$. Furthermore, conductors other than conductors $\mathbf{83_2}$ and $\mathbf{84_2}$ are maintained at ground potential so that pin electrodes corresponding to these conductors will be at ground potential or at 0 volts.

In conventional electrostatic recording systems, electrostatic latent images can be formed on the recording sheet with a recording voltage of −500 to −800 volts. Accordingly, as above described, since the recording potentials applied to pin electrodes are 0, $-(Vc/2)$, and $-V_c$, by setting −Vc to be equal to −800 volts, the pin electrodes supplied with −Vc can form latent images whereas other electrodes are not sufficiently energized to form latent images.

In this manner, video signals are sequentially distributed among first and second recording heads 4 and 7 to form latent images on both surfaces of the recording sheet corresponding to the patterns on the original.

Resistors $78_1$, $78_2$ . . . $78_n$ and resistors $79_1$, $79_2$ . . . $79_n$ connected between the collector electrodes of the driving transistors and ground potential have higher resistances than resistors $80_{11}$, $80_{12}$ . . . $80_{nn}$ and resistors $81_{11}$, $81_{12}$ . . . $81_{nn}$ (having equal resistance as resistors $80_{11}$, $80_{12}$ . . . $80_{nn}$). Resistors $78_1$, $78_2$ . . . $78_n$ and resistors $79_1$, $79_2$ . . . $79_n$ not only function to supply recording voltages to pin electrodes, but also decrease the effect of the static induction caused by interelectrode capacitances upon the pin electrodes, thus improving the quality of the reproduced patterns.

The foregoing description relates mainly to the recording device on the receiving side. Below transmission and reception systems will be described wherein video signals of the patterns of an original are formed and transmitted to remote stations over space or via a transmission line to operate recording apparatus.

Figure 8:
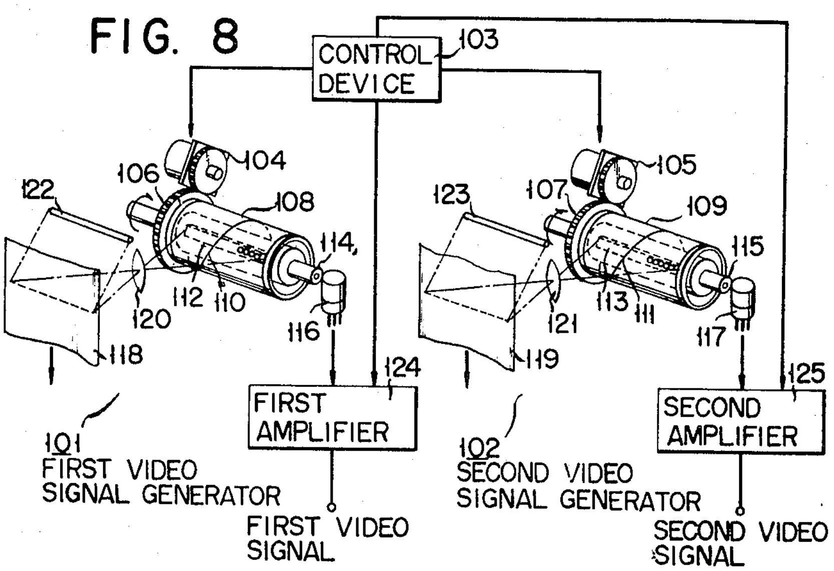
FIG. 8 is a schematic block diagram, partly in perspective, of video signal generators of the rotary drum plane scanning type utilized in the transmission apparatus.

FIG. 8 illustrates a typical transmission station, wherein video signals corresponding to the patterns to be recorded on the opposite sides of the recording sheet are formed by first and second video signal generators 101 and 102, respectively. While any of various well known types of video signal generators may be employed, typical video signal generators of the plane scanning type are illustrated in FIG. 8 by way of example. The starting times of the first and second video signal generators 101 and 102 are adjusted by a control device 103. The starting times are staggered by an interval corresponding to the spaced positional relationship between two recording heads of the recording device. In addition to providing the start signal, the control device 103 also generates a phase synchronizing signal and a termination signal and functions to assure proper supply of these signals to first and second video signal generators 101 and 102.

Responsive to the start signal from control device 103, the driving motor 104 of the first video signal generator 101 starts to rotate and then, a small interval of time later, the driving motor 105 of the second video signal generator 102 is caused to start. The torques of motors 104 and 105 are transmitted to scanning drums 108 and 109 through gears 106 and 107, respectively. Scanning drums 108 and 109 are provided with respective helical slits 110 and 111 and inside these drums are securely fixed respective light receiving heads 112 and 113, each comprising a plurality of linear optical fibers which are bundled at the output ends 114 and 115 of the drums and are coupled with photoelectric transducers 116 and 117 respectively, directly or through suitable optical systems, not shown. Optical systems 120 and 121 are interposed between scanning drums 108 and 109 and manuscripts or originals 118 and 119 respectively, and sources of line lights 122 and 123 are provided to illuminate originals 118 and 119 so as to focus the patterns carried thereby onto the scanning drums 108 and 109 through the respective optical systems 120 and 121.

Accordingly, as the scanning drums 108 and 109 and hence their helical slits 110 and 111 are rotated, the patterns on the originals are optically scanned at the crossings between helical slots 110 and 111 and linear light receiving heads 112 and 113 respectively, to produce light outputs of intensity corresponding to the brightness or tone of the patterns at the output ends 114 and 115. These light outputs are converted into electric signals by photoelectric transducers 116 and 117, respectively, and are then formed into first and second video signals having prescribed levels and signal-to-noise ratios by first and second amplifiers 124 and 125, respectively.

Although, in this embodiment two different originals are separately scanned by light, if the original is opaque, it is of course possible to scan both surfaces thereof at the same time. The same is true for other video signal generators to be described hereinbelow.

Figure 9:
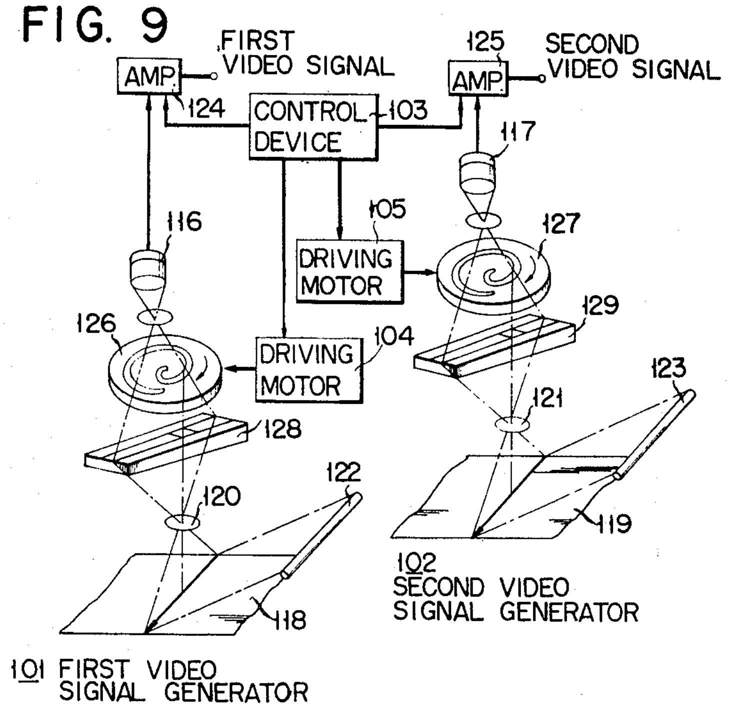
FIG. 9 is a diagrammatic representation of a pattern transmitter in which the plane scanning is performed by a disc having a spiral slit and a plate having a linear slit.

FIG. 9 shows a further embodiment of a plane scanning video signal generator. In this embodiment, the patterns on the originals 118 and 119 are optically scanned by the cooperation of spiral slits through discs 126 and 127 rotated at the same main scanning speed and stationary linear slits 128 and 129. Spirals of the discs 126 and 127 may be a spiral of Archimedes or an involute curve.

Figure 10:
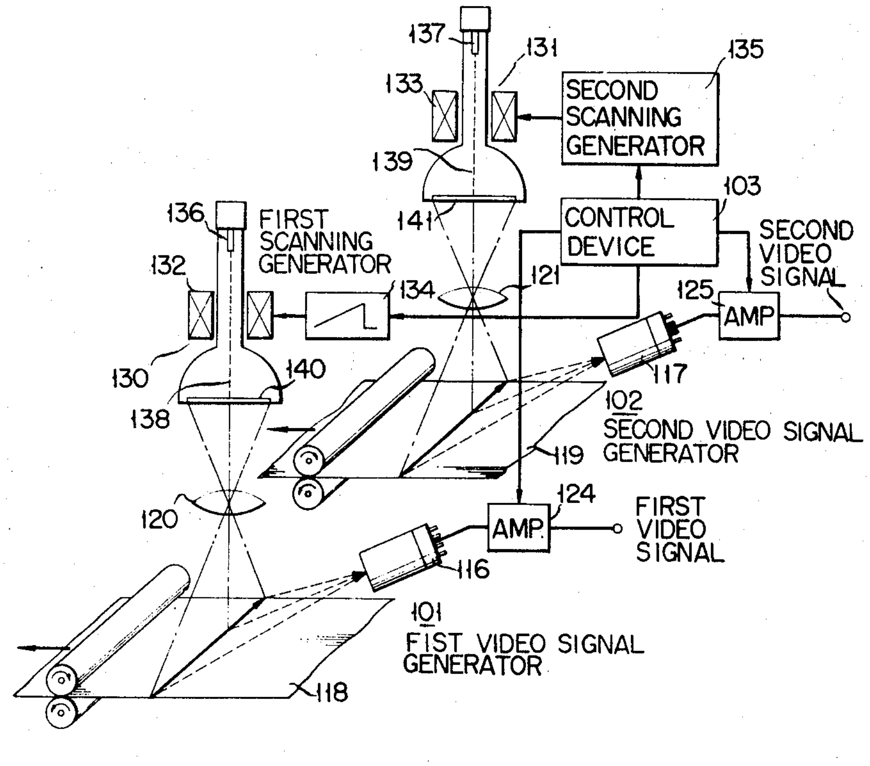
FIG. 10 is a perspective view, partly in block form, of a pattern transmitter utilizing flying spot scanning tubes for electron scanning.

FIG. 10 shows a modified embodiment of a high speed video signal generator utilizing flying spot scanning tubes 130 and 131 for effecting electron beam scanning. The deflection coils 132 and 133 of flying spot scanning tubes 130 and 131 are supplied with sweep signals from scanning generators 134 and 135, respectively, to deflect electron beams 138 and 139 emitted from electron guns 136 and 137, respectively. Electron beams 138 and 139 impinge upon fluorescent screens 140 and 141, the fluorescent light emanated from these screens being focused by means of optical systems 120 and 121 respectively to optically scan the patterns on the original. The lights reflected by the patterns are collected by photoelectric transducers 116 and 117 and are converted into electric signals which are amplified by amplifiers 124 and 125, respectively, to form first and second video signals having predetermined levels and signal-to-noise ratios. Just as in the so-called synchronized transmission system of television video signals, these first and second video signals are transmitted together with synchronizing signals supplied from the control device 103.

Figure 11:
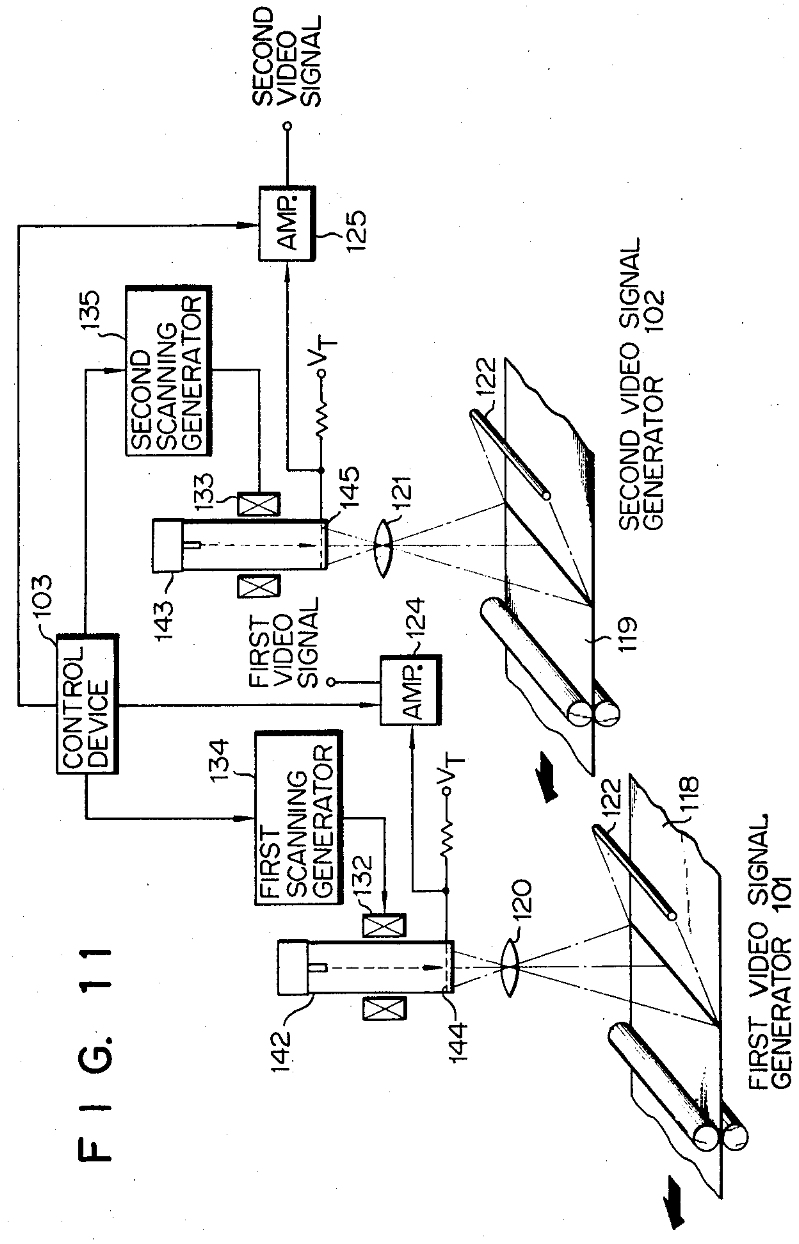
FIG. 11 is a view similar to FIG. 10, of a pattern transmitter utilizing image pickup tubes.

FIG. 11 shows a modification of a high speed electron scanning type video signal generator utilizing image pickup tubes 142 and 143. The deflection coils 132 and 133 of image pickup tubes 142 and 143 are supplied with sweep signals from the first and second scanning generators 134 and 135 under control of the control device 103 to deflect electron beams to scan the images of the patterns on originals 118 and 119 which are projected upon targets 144 and 145 of tubes 142 and 143, respectively, through optical systems 120 and 121, respectively, thus forming the first and second video signals, respectively. Assuming that $f_H$ (Hz) represents the recurring frequency of the sweep signal which provides the main scanning, and V(mm/s) the sub-scanning speed of the original, then it is possible to form video signals of $f_H$/V (lines/mm). A low speed vidicon may be used as the image pickup tube, but where video signals are transmitted over a transmission line, it is essential to convert the video signals into narrow band signals by sampling. As can be clearly noted by those skilled in the television art, any stationary scene, indoor or outdoor, may be sent by this modified embodiment.

Figure 12A:
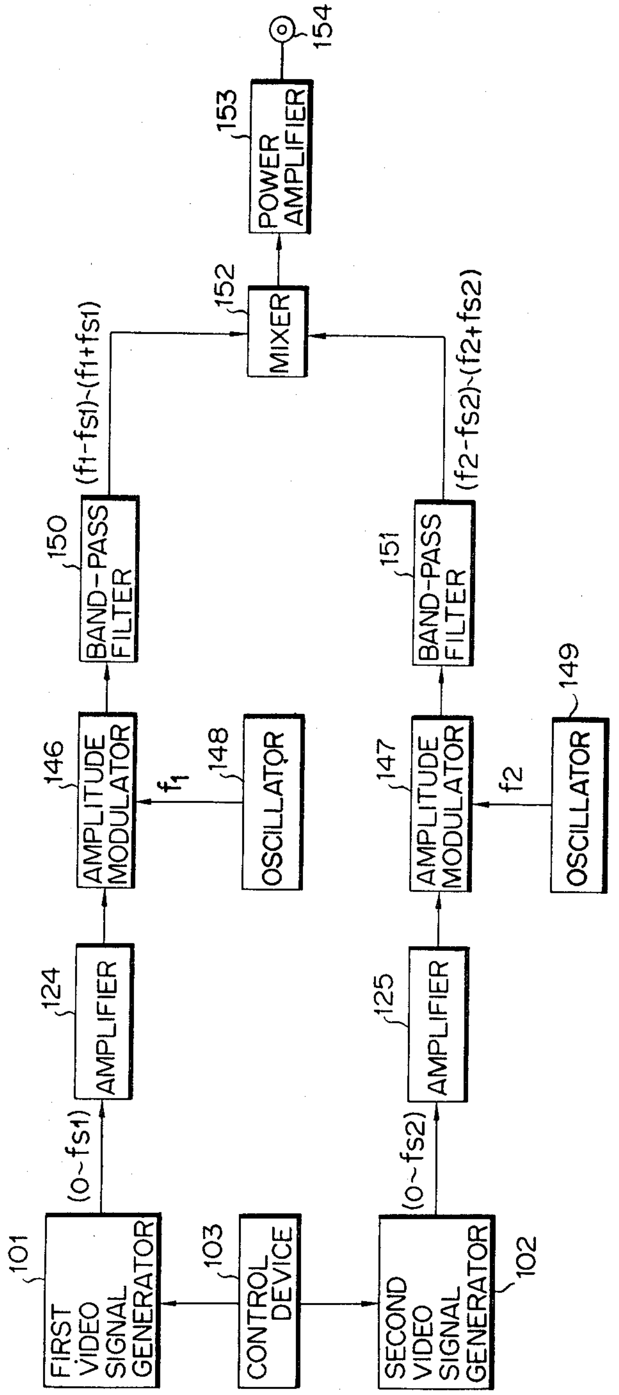
FIGS. 12A and 12B show block diagrams of transmitting and receiving systems, FIG. 12A showing the transmission system and and FIG. 12B the receiving system.
Figure 12B:
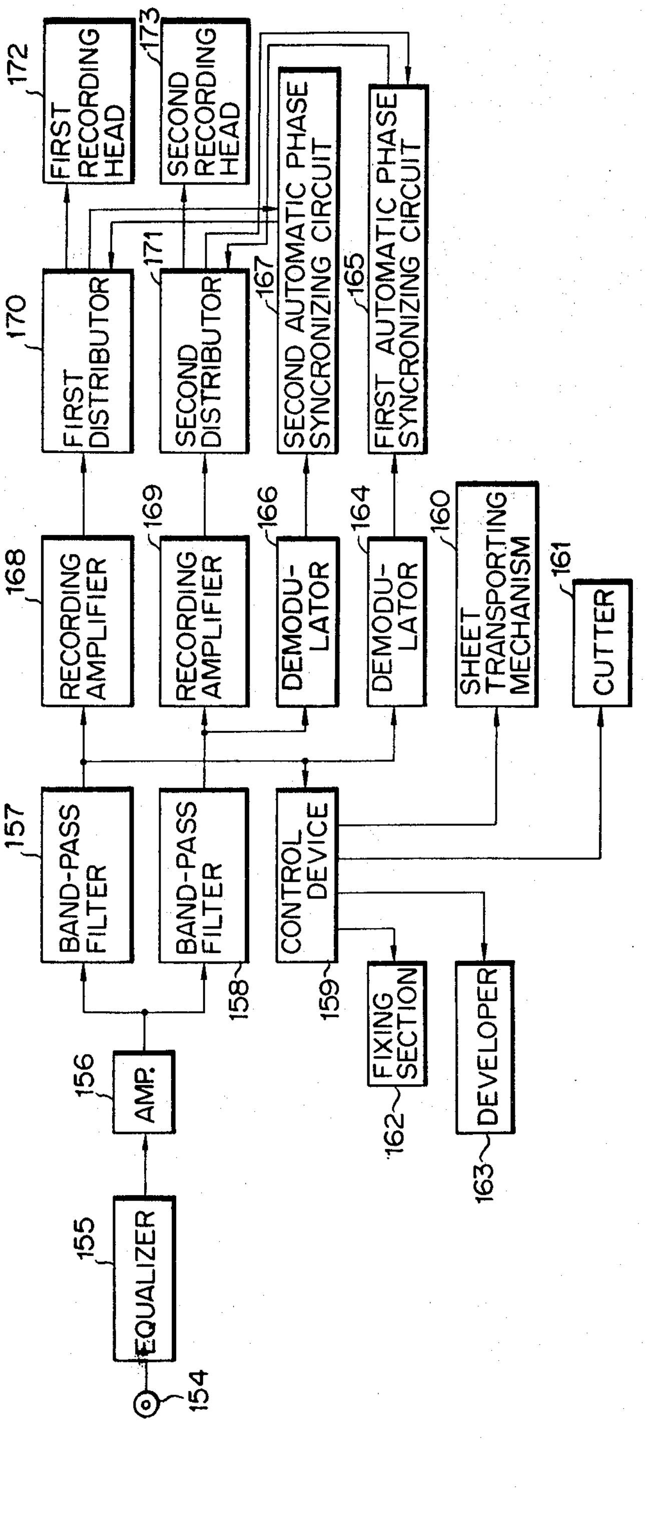

FIGS. 12A and 12B show schematic block diagrams of a transmitting device and a receiving device, respectively. In the following discussion, it is assumed that each of the first and second video signal generators 101 and 102 shown in FIG. 12A is of the plane scanning type utilizing a rotary drum as shown in FIG. 8. More particularly, video signals formed by the first and second video signal generators 101 and 102 are supplied with a start signal, motor phase synchronizing signals and a termination signal from control device 103 to produce the first and second information signals, respectively, shown in FIG. 2.

The first and second information signals respectively having frequency bandwidths of 0 $fs_1$ and 0 $fs_2$ are amplified by amplifiers 124 and 125, and are then used to effect amplitude modulation in modulators 146 and 147 of carrier wave signals supplied by oscillators 148 and 149 having frequencies of $f_1$ and $f_2$ respectively. The modulated signals are then passed respectively through bandpass filters 150 having a pass-band of ($f_1 - fs_1$) to ($f_1 + fs_1$) and 151 having a passband of ($f_2 - fs_2$) to ($f_2 + fs_2$). The outputs of the filters 150 and 151 are mixed in mixer 152. The output from mixter 152 is amplified by a power amplifier 153 to a predetermined level and is then sent to a transmission line 154. In this manner, this transmitting device transmits the signal by the so-called two-channel frequency division multiplex scheme. This is accomplished by amplitude modulation of the carrier wave by the first and second information signals containing video signals representing the patterns on the front and rear surfaces of the original.

In the receiving device shown in FIG. 12B, frequency multiplex signals received through transmission line 154 are passed through an equalizer 155 and are then amplified by an amplifier 156. Amplified signals are channel separated by bandpass filters 157 and 158. Received and separated signals belonging to the first channel are then supplied to control device 159 to operate a timer therein to form control signals for a sheet advancing (or sheet transporting) mechanism 160, a cutter 161, a fixing section 162 and a developer 163. At the same time the signal of the first channel is also supplied to a first automatic phase synchronizing circuit 165 through a demodulator 164. The received signals corresponding to the second channel are supplied to a second automatic phase synchronizing circuit 167 through another demodulator 166. Further, signals corresponding to the first and second channels are supplied to first and second distributors 170 and 171 through recording amplifiers 168 and 169, respectively, each of which may be, for example, a motor driven mechanical distributor. During each revolution of the motor, pulses are formed by phase segments which are compared with a phase synchronizing signal sent from the transmission side by the action of the first and second automatic phase synchronizing circuits 165 and 167, which are respectively coupled to the distributors 170 and 171, for effecting phase matching. Received signals distributed by distributors 170 an 171 are supplied respectively to first and second recording heads 172 and 173, each head including multi-styluses for example. Thus, distributors 170 and 171 are synchronized with the main scanning of video signal generators 101 and 102 to apply recording voltages ranging from −500V to −1,000V to the electrodes of respective recording heads 172 and 173 corresponding to video signals which represent the patterns on the front and rear surfaces of the original. In this manner, latent images of the patterns are recorded substantially simultaneously on both sides of the recording sheet.

Figure 13A:
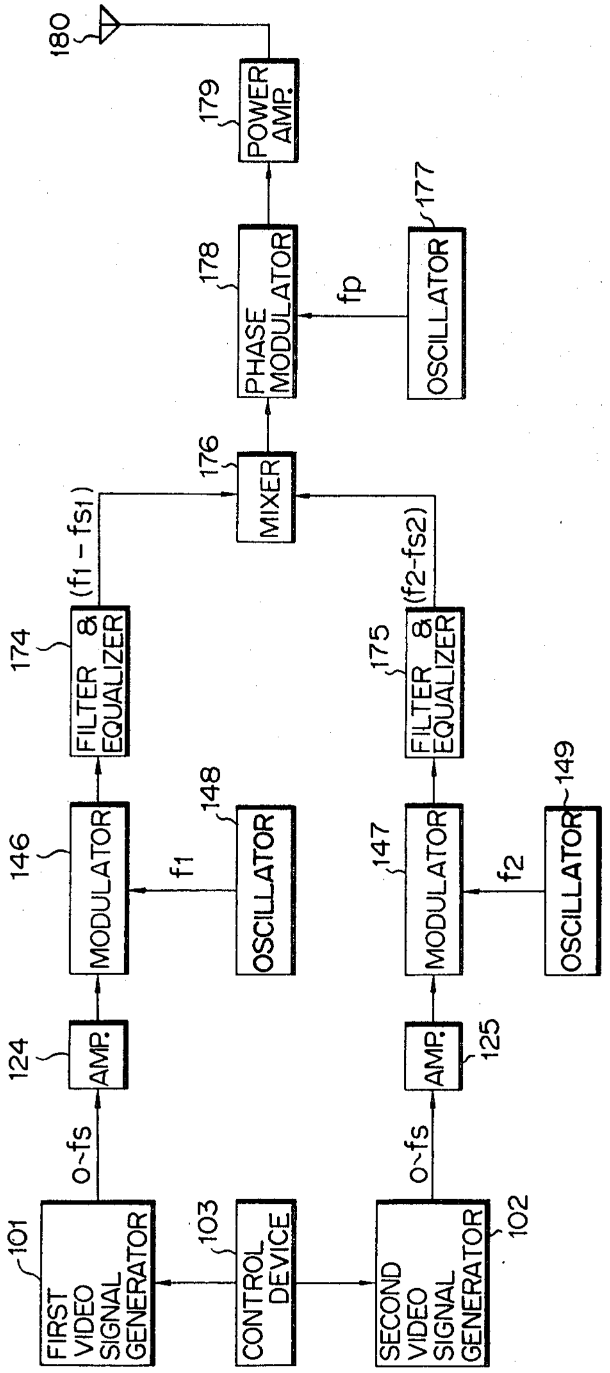
FIGS. 13A and 13B show block diagrams of modified transmitting and receiving systems, FIG. 13A showing the transmitting system and FIG. 13B the receiving system.
Figure 13B:
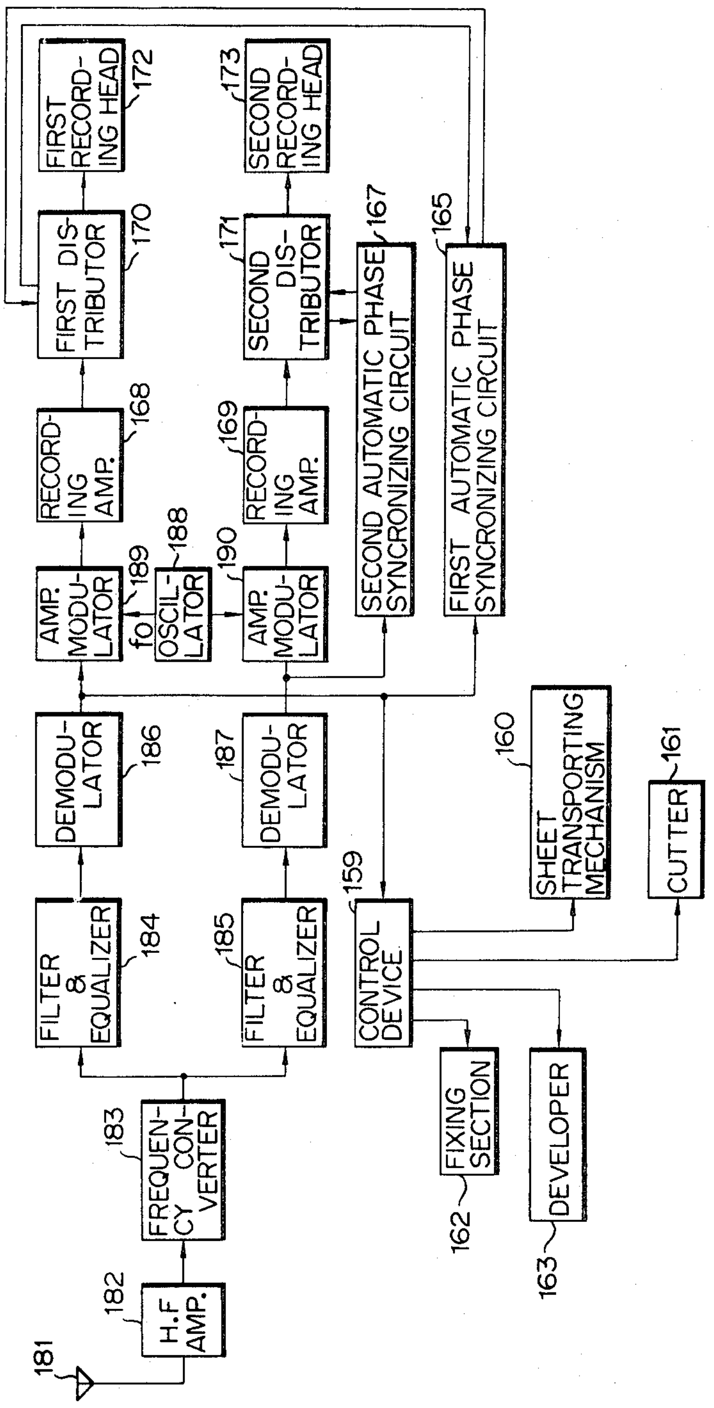

FIGS. 13A and 13B show block diagrams of other examples of transmission and reception devices. Component parts in these figures corresponding to those shown in FIGS. 12A and 12B are designated by the same reference numerals for ease of description.

In the transmission device shown in FIG. 13A, carrier waves generated by respective oscillators 148 and 149 and having carrier frequencies of $f_1$ and $f_2$ are respectively modulated by the first and second information signals in modulators 146 and 147. The modulated signals are then applied to respective filters and equalizers 174 and 175 to form residual side-band wave signals, for example, residual lower-band wave signals $f_1 - fs_1$ and $f_2 - fs_2$. These residual side-band signals are then mixed together in a mixer 176 and the output from the mixer 176 is applied to a phase modulator 178 to phase modulate the carrier wave from an oscillator 177 about a center frequency $f_p$. After being amplified by a power amplifier 179 to a predetermined level, the modulated signal is radiated into space as an electromagnetic wave through an antenna 180.

This radiated wave is received by an antenna 181 of the receiving device, shown in FIG. 13B, and is then amplified by a high frequency amplifier 182. The amplified signal is converted into an intermediate frequency signal by a frequency converter 183 to develop a signal suitable for amplification and separation. The intermediate frequency signal is then amplified and channel separated by combined filter and equalizers 184 and 185. Further the phase modulated signals are then demodulated by demodulators 186 and 187, respectively to form residual side-band wave signals of respective channels. If desired, these residual side-band wave signals are used to subject again to amplitude modulation a carrier wave supplied from an oscillator 188 operating at a frequency of $f_0$. Signals, amplitude modulated again in this manner, are especially suitable for electrostatic recording because they can be readily stepped-up. Since the other control signals and recording operations are identical to those already described with reference to FIG. 12B, their description is unnecessary. Such residual side-band wave modulation is effective where the signal is transmitted with a limited frequency bandwidth. Assuming a constant frequency bandwidth, when compared with the signals in the system of FIG. 12, the transmission and reception devices shown in FIG. 13 can operate at twice the transmission speed of the system of FIG. 12. On the other hand, the frequency bandwidth can be reduced to approximately one half, when a constant transmission speed is assumed.

The transmission and reception devices shown in FIGS. 12 and 13 can be applied both to wired and wireless systems. It is also possible to amplitude modulate either one of the first and second information signals, thus further narrowing the occupied bandwidth.

Although the above description refers to systems wherein two types of video signals concerning information on the front and rear sides of the original are formed, transmitted and recorded, it is also possible to form, transmit and record more than two types of video signals. It should also be understood that the novel system is applicable to information recording apparatus other than electrostatic recording apparatus — that is, facsimile transmission systems, phototelegraphic apparatus, etc. Although in the foregoing embodiments it is assumed that different patterns on both sides of an original are recorded on the opposite sides of a recording sheet, it is to be understood that in certain cases the same may be recorded on both sides of the recording sheet (or medium) at the receiving end, or different portions of a pattern can be recorded on different sides of the recording medium at the receiving end. Such modified schemes of recording can be accomplished within the spirit of the present invention by utilizing suitable delay circuits and gate circuits which are selectively enabled and disabled so as to cause the first and second recording heads to record video signals corresponding to any desired portions of the pattern of the original.

All of the individual blocks not explained herein in specific detail are well known in the art and the specific arrangements thereof should be apparent to those skilled in the art.

We claim:

1. A facsimile recording system for electrostatically recording patterns on both sides of a recording medium at substantially the same time comprising:

a source of first and second video signals representing at least one pattern;

first and second video signal distributors respectively receiving said first and second video signals;

means for moving said recording medium;

first and second electrostatic recording means, each facing one side of said recording medium with a predetermined gap between the recording means and the recording medium, and each respectively connected to receive video signals from said first and second video signal distributors, said first and second recording means being mutually spaced apart a predetermined distance in the direction of movement of said recording medium;

a pair of guide rollers disposed between said first and second recording means for feeding said recording medium, each guide roller contacting a respective side of said recording medium, said guide rollers being maintained at predetermined potentials to thereby avoid electrical mutual interference between said first and second recording means through said recording medium when said first and second recording means operate to record patterns represented by the video signals on said recording medium; and first and second adjusting means for adjusting the gaps between said recording medium and said first and second recording means, respectively.

2. A system according to claim 1 wherein said recording system further includes:

means to develop said patterns recorded on said recording medium; and means to fix the developed patterns on said recording medium.

3. A system according to claim 1 wherein one of said first and second video signals is delayed in time with respect to the other, said delay being equal to the time required for said recording medium to move from one of said spaced recording means to the other.

4. A system according to claim 1 wherein said first and second recording means comprise first and second spaced apart recording heads, respectively.

5. A system according to claim 4 wherein:

each of said first and second video signal distributors comprises a mechanical distributor including a plurality of stylus electrodes, and a sliding brush receiving a video signal cooperating with said stylus electrodes; and each of said first and second recording heads includes a plurality of stylus electrodes each coupled to respective stylus electrodes of the respective distributor;

video signals being sequentially distributed to the stylus electrodes of said first and second recording heads to thereby form electrostatic latent images on both sides of said recording medium corresponding to said video signals.

6. A system according to claim 4 wherein each of said first and second video signal distributors comprises a photoelectric distributor for sequentially distributing light signals corresponding to said video signals among a plurality of photoelectric elements, and each of said first and second recording heads includes a plurality of stylus electrodes each corresponding to respective ones of said photoelectric elements.

7. A system according to claim 1 wherein said first and second video signal distributors and said first and second recording means are comprised by respective pin electrode printing tubes located on either side of said recording medium.

8. A system according to claim 1 wherein said first and second video signal distributors and said first and second recording means are comprised of optical fiber printing tubes located on either side of said recording medium.

9. A system according to claim 1 wherein said first and second video signal distributors and said first and second recording means are comprised of electron beam penetration tubes located on either side of said recording medium.

10. A system according to claim 1 wherein each of said first and second video signal distributors comprises an electric distributor including a scanning generator, a plurality of gate circuits sequentially enabled by the output of said scanning generator, means coupling said video signals to said gate circuits, and driving means for coupling the outputs from said gate circuits to said recording means, said electric distributors sequentially supplying video signals to said recording means.

11. A system according to claim 1 wherein said recording medium is a five layered recording sheet comprising a substrate layer at its sectional center, and an electroconductive layer and a recording layer on each side of said substrate layer.

12. A system according to claim 1 wherein said source of first and second video signals comprises:

a transmitting device including:

first and second video signal generators for generating first and second signals representing at least one pattern;

a modulator for modulating at least one of said first and second signals; and means for transmitting the modulated signal; and receiving means for receiving said transmitted signal and generating first and second received signals corresponding to said first and second video signals, respectively.

13. A system according to claim 12 wherein said transmitting device comprises an amplitude modulator for at least one of said first and second signals, a mixer for mixing the at least one modulated signal and the other signal, and an amplifier for amplifying the output signal from said mixer.

14. A system according to claim 12 wherein said transmitting device comprises a residual side-band wave modulator for at least one of said first and second signals, respective filters to limit the frequencies of said first and second signals to prescribed bandwidths, a mixer for mixing the outputs from said filters, and an amplifier for amplifying the output from said mixer.

15. A system according to claim 12 wherein said first and second video signal generators each comprise a rotary cylinder having a helical slit therein and rotated at a predetermined speed, an optical system for focusing an image of a pattern onto said cylinder, a light receiving means including a plurality of linear optical fibers fixed in said cylinder, and a photoelectric transducer for converting the optical output of said light receiving means into an electric signal.

16. A system according to claim 12 wherein said first and second video signal generators each comprise a stationary member having a linear slit therein, a circular disc having a spiral slit, said disc being rotated at a predetermined speed, a photoelectric transducer for converting light into an electric signal, and an optical system for focusing light corresponding to the pattern to be recorded onto said member and disc, said focused light being transmitted through said linear slit and said spiral slit of said disc upon said photoelectric transducer.

17. A system according to claim 12 wherein said first and second video signal generators each comprise a scanning generator for generating a sweep signal of a predetermined frequency, a flying spot scanning tube supplied with said sweep signal from said scanning generator and an optical system for focusing a bright spot of the flying spot scanning tube upon a pattern to be recorded.

18. A system according to claim 12 wherein said first and second video signal generators each comprise an image pick-up tube, an optical system for focusing the image of a pattern on the target of said image pick-up tube, and means to scan said image on said target.

19. A system according to claim 1 wherein said first and second adjusts means respectively adjusting gaps between said recording medium and said first and second recording means to values determined by Paschen's law.

20. A system according to claim 19 wherein said first and second adjusting means are respectively disposed on opposite sides of said recording means relative to said first and second recording means.

21. A facsimile recording system according to claim 19 wherein said first and second adjusting means are respectively disposed to contact one side of said recording medium

22. A facsimile recording system according to claim 19 wherein said first and second adjusting means comprise first and second rollers maintained at predetermined potentials, and disposed opposite said first and second recording means, respectively, and on opposite sides of said recording medium relative to said recording means.

* * * * *